(12) United States Patent
Fascenda et al.

(10) Patent No.: US 8,548,002 B2
(45) Date of Patent: Oct. 1, 2013

(54) SYSTEMS AND METHODS FOR ADAPTIVE MULTI-RATE PROTOCOL ENHANCEMENT

(75) Inventors: Anthony Fascenda, Rockville, MD (US); Emil Sturniolo, Medina, OH (US); Robert Cichielo, Asbury, NJ (US); Paul Benware, Mendon, NY (US)

(73) Assignee: Koolspan, Inc., Bethesda, MD (US)

( * ) Notice: Subject to any disclaimer, the term of this patent is extended or adjusted under 35 U.S.C. 154(b) by 475 days.

(21) Appl. No.: 12/028,370

(22) Filed: Feb. 8, 2008

(65) Prior Publication Data

US 2009/0204393 A1 Aug. 13, 2009

(51) Int. Cl.
*H04J 3/24* (2006.01)

(52) U.S. Cl.
USPC .................................................. 370/474

(58) Field of Classification Search
USPC .................. 370/465, 470, 472, 474, 476, 477
See application file for complete search history.

(56) References Cited

U.S. PATENT DOCUMENTS

| | | | |
|---|---|---|---|
| 5,293,379 A * | 3/1994 | Carr .......................... | 370/474 |
| 5,689,563 A | 11/1997 | Brown et al. | |
| 6,032,197 A | 2/2000 | Birdwell et al. | |
| 6,680,955 B1 * | 1/2004 | Le .............................. | 370/477 |
| 7,009,969 B1 * | 3/2006 | Parrish et al. ................. | 370/390 |
| 2002/0015403 A1 * | 2/2002 | McConnell et al. .......... | 370/352 |
| 2003/0189900 A1 * | 10/2003 | Barany et al. ................. | 370/229 |
| 2004/0136476 A1 * | 7/2004 | Rosen et al. .................. | 375/340 |
| 2005/0048971 A1 | 3/2005 | Findikli et al. | |
| 2006/0154695 A1 | 7/2006 | Ishibashi | |
| 2007/0091924 A1 | 4/2007 | Hsieh et al. | |
| 2008/0021712 A1 * | 1/2008 | Fejzo .......................... | 704/500 |
| 2012/0014268 A1 * | 1/2012 | Damnjanovic et al. ....... | 370/252 |

FOREIGN PATENT DOCUMENTS

WO WO 2007/059201 5/2007

OTHER PUBLICATIONS

International Search Report Dated Apr. 3, 2008 for International Application No. PCT/US07/26441.
International Search Report dated Jul. 22, 2008 for Application No. PCT/US08/64970.
International Search Report dated Apr. 3, 2008 for Application No. PCT/US07/26441.
Supplementary European Search Report and Search Opinion for European Application No. 08756365.6, mailed Nov. 17, 2011.

\* cited by examiner

*Primary Examiner* — Mark Rinehart
*Assistant Examiner* — Peter Cheng
(74) *Attorney, Agent, or Firm* — Hunton & Williams LLP

(57) ABSTRACT

A method of processing a codec sample is provided. The method includes: removing from a first portion of the codec sample, a first number of first information bits. The first information bits are indicative of frame information associated with the codec sample. The method also includes inserting at the first portion of the codec sample from a second portion of the codec sample, a second number of data bits. The first number of the first information bits is greater than or equal to the second number of the data bits. The method also includes removing the second portion of the codec sample. The method may also include encrypting and decrypting the codec sample. In some embodiments, the codec sample is an adaptive multi-rate codec sample. In some embodiments, the adaptive multi-rate codec sample is a 5.15 mode adaptive multi-rate codec sample.

19 Claims, 4 Drawing Sheets

SYSTEMS AND METHODS FOR ADAPTIVE MULTI-RATE PROTOCOL ENHANCEMENT

CROSS REFERENCE TO RELATED APPLICATIONS

The present application is related to U.S. Utility patent application Ser. No. 11/951,202, titled "Secure Mobile Telephony" to Fascenda et al., which is based on U.S. Provisional Application No. 60/987,709 titled "Secure Mobile Telephony" to Fascenda et al., the disclosures of each of which are incorporated by reference herein in their entireties.

FIELD OF THE INVENTION

The field of the present invention relates generally to secure voice communications, and more particularly to adaptive multi-rate protocol enhancements for secure voice communications.

BACKGROUND OF THE INVENTION

The number of voice communication systems has grown significantly as technology has advanced. Accordingly, bandwidth over which voice data is transmitted and received is at a premium and technological advances for conserving bandwidth are desired. For example, Global System for Mobile Communications ("GSM") standards as well as non-GSM standards provide for transmission of data at different maximum bit rates. Accordingly, transmitting data at below the maximum bit rate for a particular standard is imperative. Adaptive multi-rate ("AMR") codecs operate according to encoding and decoding schemes that can reduce the required bandwidth for representing data. AMR codecs can be tailored to provide encoding and decoding at a number of different bit rates based on factors such as the channel conditions, system requirements or the like. The conventional AMR protocol is disclosed in "3GPP TS 26.101 v7.0.0 (2007-06) 3rd Generation Partnership Project; Technical Specification Group Services and System Aspects; Mandatory speech codec speech processing functions; Adaptive Multi-Rate (AMR) speech codec frame structure (Release 7)," which is incorporated herein by reference in its entirety. Unfortunately, conventional AMR protocols utilize unnecessary bandwidth thereby reducing the potential bandwidth efficiency of voice communications systems.

Further, improvements in technology have also provided opportunities for compromising the security and/or integrity of voice communications. Unfortunately, security protocols to protect voice data typically disadvantageously result in an increase in the overhead for the voice communications and a loss of bandwidth efficiency. As such, there is a desire for systems and methods for improving the bandwidth efficiency of AMR codecs that process voice data thereby allowing for a greater amount of bandwidth for the provisioning of security.

SUMMARY OF EMBODIMENTS OF THE INVENTION

In one embodiment, a method of generating an enhanced codec sample is provided. The method includes: removing from a first portion of a codec sample, a first number of information bits. The information bits are indicative of redundant information of the codec sample. The method also includes copying from a second portion of the codec sample, a second number of bits to the first portion of the codec sample. The first number of information bits is greater than or equal to the second number of bits. The method also includes discarding the second portion of the codec sample thereby generating an enhanced codec sample. The method may also include encrypting and decrypting the enhanced codec sample. In some embodiments, the codec is an adaptive multi-rate codec. In some embodiments, the adaptive multi-rate codec is a 5.15 mode codec.

In another embodiment, a method of performing adaptive multi-rate protocol enhancement is provided. The method includes removing from a first portion of an AMR sample, a first number of information bits, the information bits being indicative of redundant information of the AMR sample. The method also includes copying from a second portion of the AMR sample, a second number of bits to the first portion of the AMR sample, the first number of information bits being greater than or equal to the second number of bits and the second portion of the AMR sample including a bit stuffing portion having comfort noise bits and a data portion comprising the second number of bits. The method also includes discarding the second portion of the AMR sample thereby generating an enhanced AMR sample.

BRIEF DESCRIPTION OF THE DRAWINGS

These and other features and aspects of the embodiments of the present invention will become better understood when the following detailed description is read with reference to the accompanying drawings in which like reference numerals represent like components throughout the drawings, wherein.

DETAILED DESCRIPTION

Certain embodiments of the present invention include techniques for secure and bandwidth efficient communication of voice data. In some embodiments, the voice data is transmitted between communication devices, which may include, but are not limited to, mobile headsets and mobile handsets. The communication devices are each similarly equipped to perform one or more methods of the present invention and/or similarly equipped to include a module in accordance with the present invention. In some embodiments, the secure and bandwidth efficient voice communications is provided by a system including an AMR 5.15 mode codec.

Figure 1:
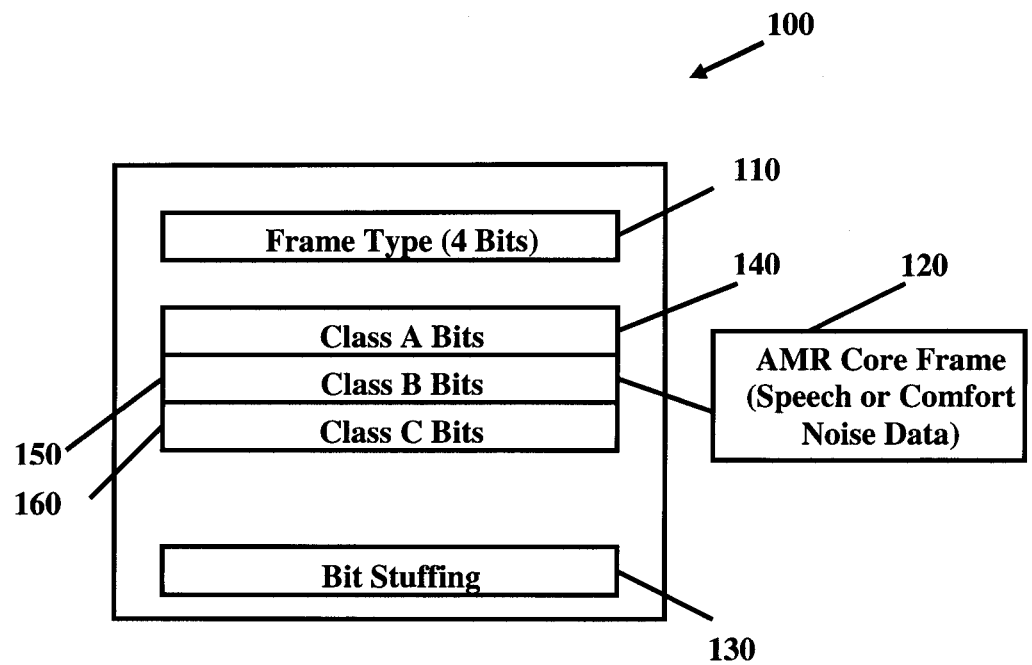
FIG. 1 is a block diagram of a frame structure for adaptive multi-rate protocol enhancement according to an embodiment of the present invention.

FIG. 1 is a block diagram of a frame structure for adaptive multi-rate protocol enhancement according to an embodiment of the present invention. Frame structure 100 may be the structure for AMR interface format 2 ("AMR IF2"), which is a format that may be used with applications that require byte alignment. The term "byte alignment" as used herein means "the configuration of a field composed of an integral number of bytes." In cases in which the field has bits that are extraneous after dividing the portions of the field into bytes, the extraneous bits may be added to the first byte for left justification bit stuffing of the field or added to the last byte for right justification bit stuffing of the field. Each of the added bits may have a value of zero in some embodiments. As is known to those skilled in the art, the term "byte alignment" may be analogous to the term "octet alignment," which is the configuration of a field composed of an integral number of octets.

Frame structure 100 includes a frame type portion 110, a core frame portion 120 and a bit stuffing portion 130. Frame type portion 110 may be a header in some embodiments. The header may include redundant information, the existence of which may be utilized as a principle of the present invention, for improvement of bandwidth efficiency in the AMR codec. In one embodiment, the redundant information is redundant as compared to AMR samples that occur before and after a sample of interest. In each of the samples, when voice data is being processed by the AMR codec, the information is indicative of the frame type being that for the transmission of voice data. In some embodiments, the header may include information indicative of the AMR mode by which the core frame portion 120 will be processed.

The core frame portion 120 includes one or more sub-portions of bits. Core frame portion 120 may include speech (i.e., voice) data or comfort noise bits, such as background noise. In some embodiments, the one or more sub-portions of bits are categorized by class according to the type of treatment that should be afforded to each of the sub-portions of bits.

In some embodiments, core frame portion 120 includes only a single class of bits and all bits receive substantially the same class of treatment. In other embodiments, as shown in FIG. 1, core frame portion includes a plurality of classes of bits and the bits of different classes receive different treatment. In some embodiments, the different classes of bits may receive different processing for provisioning of the different treatment.

In the embodiment shown, the bits are categorized into Class A 140, Class B 150 and Class C 160. By way of example, Class A may include the bits designated to receive the highest level of treatment, Class B may include the bits designated to receive a mid-level treatment and Class C may include the bits designated to receive the lowest level of treatment.

For example, the different classes may receive different error protection provisioning. In the embodiment shown, Class A may contain the bits most sensitive to errors and errors in those bits may result in noticeably degraded speech. In some embodiments, the speech is noticeably degraded if it receives less than an "acceptable" Mean Opinion Score ("MOS").

In one embodiment, Class A bits are those that should not be decoded without applying appropriate error correction protocols. For example, bits within Class A may be protected via a codec cyclic redundancy check ("CRC") field that is included in AMR auxiliary information.

Additionally, Classes B and C may contain bits that are not protected as rigorously as the bits of Class A and, therefore, increasing error rates may gradually reduce the speech quality resultant from processing these bits. However, decoding of an erroneous speech frame may typically be possible without detection of artifacts that would result in a MOS rating of less than "acceptable."

Within AMR Core Frame 120, the classes of bits may be arranged such that the bits are progressively less sensitive to errors and/or progressively receive a lower level of treatment either within a class and/or across the entire AMR Core Frame 120.

Accordingly, Class B bits may be more sensitive to errors than Class C bits. Further, in some embodiments, the bits within a single class may also be arranged in an order of decreasing sensitivity to errors from Class B towards Class C. Accordingly, in some embodiments, there is no significant difference in the error sensitivity of bits that neighbor on each side of a class border. For example, there may be no significant difference in the error sensitivity of the bit of Class B that borders Class C and the bit of Class C that borders Class B. As is well known in the art, any of the different classes may be designated to receive any level of treatment. Further, two or more classes may be designated to receive the same level of treatment. In embodiments of the invention discussed below, knowledge of the level of treatment afforded to bits may be utilized to improve bandwidth efficiency in AMR samples while maintaining voice quality at a MOS rating of "acceptable" or above.

Table 1 illustrates AMR provisioning of voice communications at different modes, which correspond to different encoding rates. Referring to FIG. 1 and Table 1, frame type portion 110 may include information indicative of any number of eight different types of frames, each of which corresponds to an AMR codec mode. The AMR codec mode is a mode indicative of the number of bits that may be processed over a period of time. For example, frame type "1" corresponds to an AMR mode wherein 5.15 kbit/s may be processed while frame type "7" corresponds to an AMR mode wherein 12.12 kbit/s may be processed. However, as noted above, voice communication is limited by the standard of the system over which the data is being transmitted. For example, the GSM Circuit Switched cellular connection is limited to a bit rate of only 9.6 kbit/s while other GSM standards provide for bit rates up to a maximum of 56 kbits/s. Accordingly, if a GSM standard is used that limits the bit rate to 9.6 kbits/s, frame type "1" may be employed and further enhanced in order to be able to provide security while maintaining a bit rate less than the maximum rate of 9.6 kbit/s. The same theory applies to any number of standards in which the systems and methods of the present invention may be employed for transmitting data at less than or equal to the value that may be the maximum bit rate for the system. Accordingly, the present invention may be extended to other AMR mode codecs other than the 5.15 mode codec once a knowledge of the structure of the frame is ascertained. Such extension of the present invention to other modes is envisaged within the scope of the application.

Each AMR mode may provide for categorization of one or more bits processed. As shown with reference to the 5.15 AMR mode codec, the bits may be categorized into 49 Class A bits and 54 Class B bits. In the embodiment shown, this class division is merely exemplary and provides an illustration of the manner in which the generic format of the AMR Core Frame 120 shown in FIG. 1 may be mapped into specific formats. The specific formats may be categorizations of numbers and types of bits as shown in Table 1.

As shown in Table 1, the AMR codec may provide encoding (and decoding) at eight different encoding (and decoding) rates. The AMR codec mode may be the encoding rate for the input voice data and may represent kbit/s. The information may detail the framing of each of the different modes and bit rates. As shown in Table 1, the 5.15 AMR codec mode may output 5.15 kbit/s voice samples. Accordingly, the 5.15 mode codec may produce 103 bits of signal samples every 20 milliseconds.

TABLE 1

| Frame Type | AMR codec mode | Total number of bits encoded in an input block | Number of Class A bits encoded in an input block | Number of Class B bits encoded in an input block | Number of Class C bits encoded in an input block |
|---|---|---|---|---|---|
| 0 | 4.75 | 95 | 42 | 53 | 0 |
| 1 | 5.15 | 103 | 49 | 54 | 0 |
| 2 | 5.90 | 118 | 55 | 63 | 0 |
| 3 | 6.70 | 134 | 58 | 76 | 0 |
| 4 | 7.40 | 148 | 61 | 87 | 0 |
| 5 | 7.95 | 159 | 75 | 84 | 0 |
| 6 | 10.2 | 204 | 65 | 99 | 40 |
| 7 | 12.12 | 244 | 81 | 103 | 60 |

Table 2 shows a manner of formatting AMR IF2 frames for a plurality of different frame types. Table 2 also illustrates the bit stuffing necessary to accomplish byte alignment. As the bit stuffing may be performed by stuffing null bits, comfort noise bits or other bits that are of low importance relative to data bits, knowledge of the location of the bits that are stuffed in the frame may enable one to carry out embodiments of the invention. For example, for frame type "1", frame type portion 110 may include 4 bits, core frame portion 120 may include 103 bits and bit stuffing portion 130 may include five bits to ensure byte alignment. Accordingly, five bits of the bit stuffing portion correspond to bits of low importance.

When adding in the additional bit stuffing in bit stuffing portion 130, in one embodiment, if there is one start bit, one stop bit and eight data bits per byte, there are 10 bits per byte. With 14 bytes, which is the number of bytes provided for a 5.15 AMR codec mode, there are 140 bits per sample. Given that there are 50 samples per second, the audio encoded payload requires a channel that provides a bit rate of at least 7000 bits/second for the 5.15 codec mode. Each AMR sample that is generated for a selected AMR mode codec has substantially the same format. Table 2 illustrates the structures for different AMR mode codecs.

TABLE 2

| Frame Type Index | Frame content | Number of bits in Frame Type | Number of Bits in AMR Core Frame | Number of Bits in Bit Stuffing | Number of bytes (N) |
|---|---|---|---|---|---|
| 0 | AMR 4.75 | 4 | 95 | 5 | 13 |
| 1 | AMR 5.15 | 4 | 103 | 5 | 14 |
| 2 | AMR 5.90 | 4 | 118 | 6 | 16 |
| 3 | AMR 6.70 | 4 | 134 | 6 | 18 |
| 4 | AMR 7.40 | 4 | 148 | 0 | 19 |
| 5 | AMR 7.95 | 4 | 159 | 5 | 21 |
| 6 | AMR 10.2 | 4 | 204 | 0 | 26 |
| 7 | AMR 12.2 | 4 | 244 | 0 | 31 |
| 8 | AMR SID | 4 | 39 | 5 | 6 |
| 9 | GSM-EFR SID | 4 | 43 | 1 | 6 |
| 10 | TDMA-EFR SID | 4 | 38 | 6 | 6 |
| 11 | PDC-EFR SID | 4 | 37 | 7 | 6 |
| 12-14 | For future use | — | — | — | — |
| 15 | No Data | 4 | 0 | 4 | 1 |

Table 3 illustrates the structure of each AMR IF2 5.15 codec mode sample that is generated. As illustrated, with reference to Table 2 above, the frame type for the 5.15 mode codec is the value "1". Accordingly, with reference to Table 3, in the frame type portion of byte zero, the information is indicative of a value of "1". Such information is redundant across AMR 5.15 mode codecs and may be utilized to determine locations that may be used for bit stuffing and increasing bandwidth efficiency thereby.

Also, with reference to Table 3, there are a total of 14 bytes and 5 stuffing bits as shown in Table 2 to achieve byte alignment in the 5.15 mode codec. The last portion of the AMR sample is byte 13 and includes valuable information for the three least significant bits designated as d(102), d(101) and d(100) while it contains stuffing bits in the form of null bits or comfort noise in another portion of byte 13.

Additionally, in the AMR 5.15 mode codec, the first portion of the sample is byte zero, which includes information that is redundant relative to other information from previous samples. In some embodiments, the redundant information is information indicative of the frame type and is provided over one or more bit locations within the portion of the byte corresponding to the last four significant bits. Further, in numerous embodiments of the AMR 5.15 mode codec, random samples provide evidence that the entire byte zero is information that is redundant across samples. For the 5.15 codec mode, the frame type information will be substantially the same for each AMR sample and knowledge of such may be used to reduce bandwidth.

TABLE 3

| | MSB | | | | | | | LSB |
|---|---|---|---|---|---|---|---|---|
| | | | | Mapping of bits AMR 5.15 | | | | |
| Byte | bit 7 | bit 6 | bit 5 | bit 4 | bit 3 | bit 2 | bit 1 | bit 0 |
| 0 | d(3) | d(2) | d(1) | d(0) | 0 | Frame Type (=1) 0 0 | | 1 |
| 2 | d(11) | d(10) | d(9) | d(8) | d(7) | d(6) | d(5) | d(4) |
| 3 | ... | ... | ... | ... | ... | ... | ... | d(12) |
| 13 | | | Stuffing bits | | | | d(102) | d(101) | d(100) |

Use of the frame structure to perform selective bit stuffing according to the embodiments of the invention. Selective bit stuffing may provide improvement of the bandwidth efficiency by lossless or lossy methods as described with reference to FIG. 2 and FIG. 3, respectively.

Figure 2:
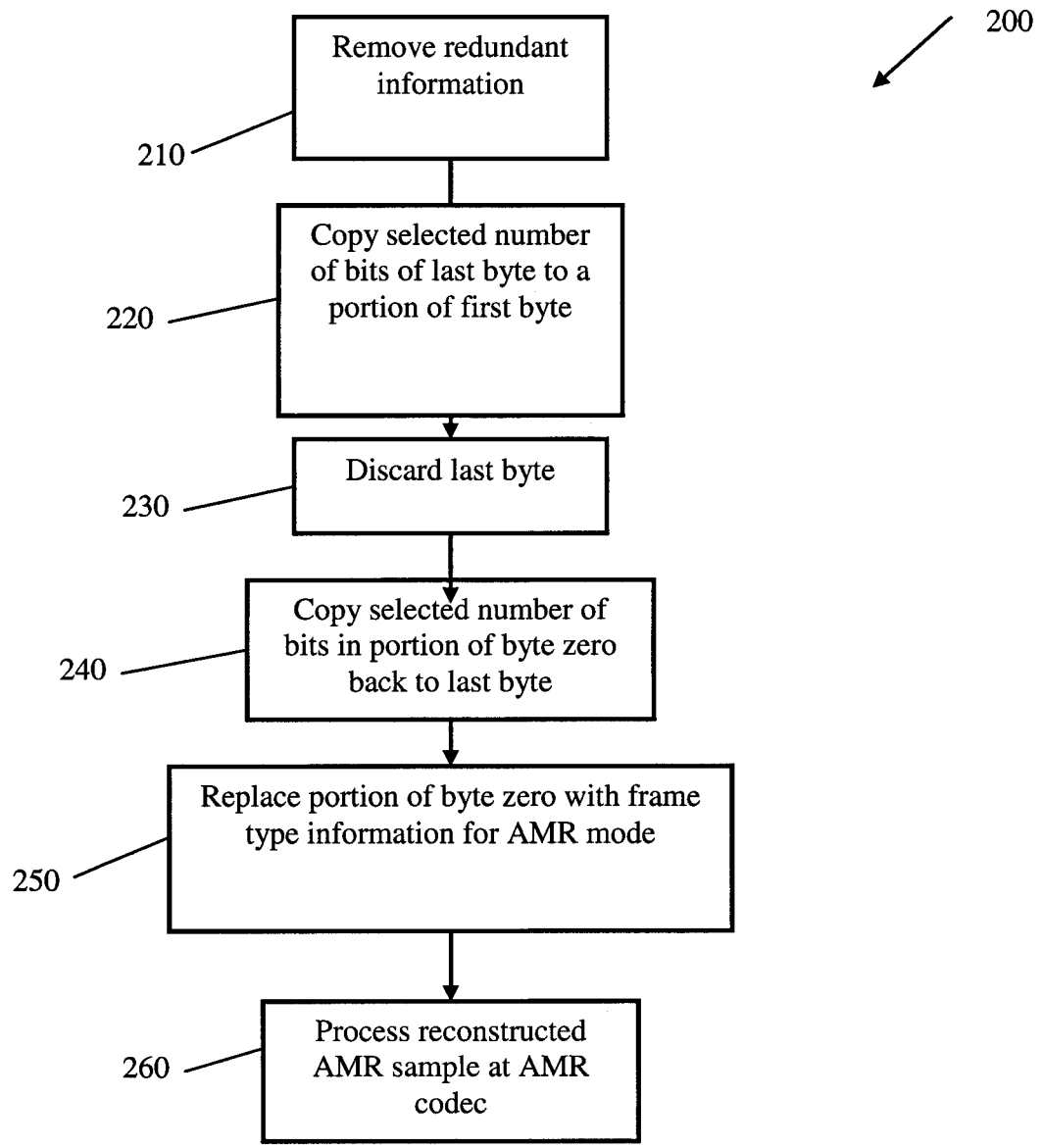
FIG. 2 is a flowchart illustrating a lossless bit stuffing method according to an embodiment of the present invention.

FIG. 2 is a flowchart illustrating a lossless bit stuffing method according to an embodiment of the present invention. Method 200 may be provided for AMR IF2 frame formats for the 5.15 codec mode such as that shown in Table 3. Embodiments of method 200 may advantageously reduce each AMR sample from its original size of 14 bytes to 13 bytes thereby reducing the bandwidth required for transmission of the data, and providing more bandwidth that may be used to accommodate security provisioning. In some embodiments, method 200 may be any method that reduces a number of bytes of an AMR sample based on removal of redundant or previously-known information.

In block 210, a portion of the redundant information in the first byte is removed. In one embodiment, the portion may correspond to one or more bits of the frame type portion of the first byte. In other embodiments, the portion may correspond to any number of bits in the first byte. The maximum number of bits in the first byte may be removed in some embodiments.

In block 220, a selected number of bits from the last byte of the AMR sample are copied (or moved) to a same number of bits in the first byte. The bits from the last byte may be copied (or moved) to contiguous locations in the first byte or non-contiguous locations in the first byte. In some embodiments, the bits from the last byte are moved to a same number of bits in the frame type portion of the first byte. In some embodiments, the number of bits of the last byte that are copied (or moved) may be any number that is less than or equal to the number of bits in byte zero when the entirety of byte zero is redundant across samples, and less than or equal to the number of bits in the frame type portion when only the frame type portion of byte zero is redundant across samples.

In one embodiment, byte 13 includes only three voice data bits and the bits are in the three least significant bits of byte 13. Accordingly, the three least significant bits of byte 13 may be copied (or moved) to any three bit locations in byte zero when the entirety of byte zero is redundant across samples, and may be copied (or moved) to any three bit locations in the frame type portion of byte zero when only the frame type portion of byte zero is redundant across samples.

In block 230, the last byte of the AMR sample is discarded. Accordingly, the AMR sample is reduced in size by one byte, thereby reducing the bandwidth required to transmit the data.

In some embodiments, the AMR sample may also be encrypted after the last byte of the AMR sample is discarded and before transmission of the AMR sample in order to provide security of the voice communications. Encryption may be performed by any number of suitable methods for securing voice communications providing that the total bandwidth for transmitting the reduced AMR sample that has received security provisioning is less than the maximum bandwidth that may be provided by the system.

Blocks 210, 220, 230 may be performed at a transmitter in a voice communication system. In one embodiment, the transmitter may be in a communication device such as a mobile headset or a mobile handset.

With reference to blocks 210, 220, 230, redundant information, such as frame type information, may be removed after the data is determined to be voice data because every AMR sample will be voice data. Therefore, the frame type is substantially the same across frames, and there is therefore wasted bandwidth when the frame type information is transmitted.

Referring back to method 200, in block 240, the last byte may be appended to the AMR sample and the bits in the bit locations copied to the first byte of the AMR sample may be copied (or moved) back to the last byte of the AMR sample, while the remaining bits in the last byte may be stuffed as originally provided at the transmitter. In one embodiment, the bits of byte zero are copied (or moved) back to the three voice data bits in the three least significant locations in the last byte and the bit stuffing is provided again at the last byte. Block 240 may be performed at a receiver configured with information about the number and location of bits copied (or moved) in the transmitter between the last byte and the first byte.

In block 250, the portion of byte zero may be replaced with bits originally provided at the locations to which the last byte of bits were copied (or moved). In one embodiment, a number of bits indicative of the frame type are placed in the frame type portion of the first byte. The content of the bits may be known because it is redundant information as each sample is a sample of voice data for an AMR 5.15 mode codec as specified in Table 2. In some embodiments, the frame type information may be indicative of the frame type being a "1" frame type. In block 260, a fully reconstructed AMR sample is processed at the AMR codec. Processing may include decoding and playback to a user.

Blocks 240, 250, 260 may be performed at a receiver. In some embodiments, blocks 240, 250 and 260 may be performed at a communication device such as a mobile headset or a mobile handset. The mobile headset (or handset) may be that of a user receiving a voice signal such as signals indicative of words being communicated to the user through the mobile headset (or handset).

Some embodiments of method 200 advantageously provide a substantially lossless compression scheme that enables security provisioning while providing improved bandwidth efficiency. Accordingly, because the method is substantially lossless, there is no significant degradation in the quality of the voice communications. Further, moving and storing data between the last byte and the first byte, as provided for in method 200, is not likely to add any perceptible latency into the data path.

In one embodiment of the invention, each AMR sample can be reduced from its original size of 14 bytes to 13 bytes. With reference to Table 3, in byte number 13 there are only three voice data bits. Because the frame type will be the same for every voice frame (i.e., type "1" since the AMR codec mode is 5.15), the information indicative of the frame type is redundant across frames and is therefore previously-known after ascertaining the frame type of at least one frame. Accordingly, the information indicative of the frame type can be replaced with other information.

The three bits of byte 13 can therefore be copied (or moved) to the three bits of the frame type field in byte 0. The last byte of the AMR sample, which is the byte that includes the three bits that were copied (or moved) to byte 0 and that also includes the bit stuffing portion, can then be discarded as all pertinent information from the byte has been stuffed into another location of the AMR sample. Discarding the last byte may be done prior to transmission and thereby reduces the bandwidth required to transmit the voice data. Further, discarding may be performed prior to encryption as well and therefore the additional overhead in the transmitted information that results from encryption may be added while maintaining the total required bandwidth to less than the maximum provided by the channel. Upon reception, the receiver can do the reverse operation: copy (or move) the three bits of byte zero into the three bits of byte 13 of the sample. The receiver then replaces the three least significant bits of the packet type field in byte zero with the known frame type for the 5.15 mode of codec operations as specified in Table 2 (i.e. "1"). It then processes the fully reconstructed AMR sample with the AMR codec for playback to a user.

Figure 3:
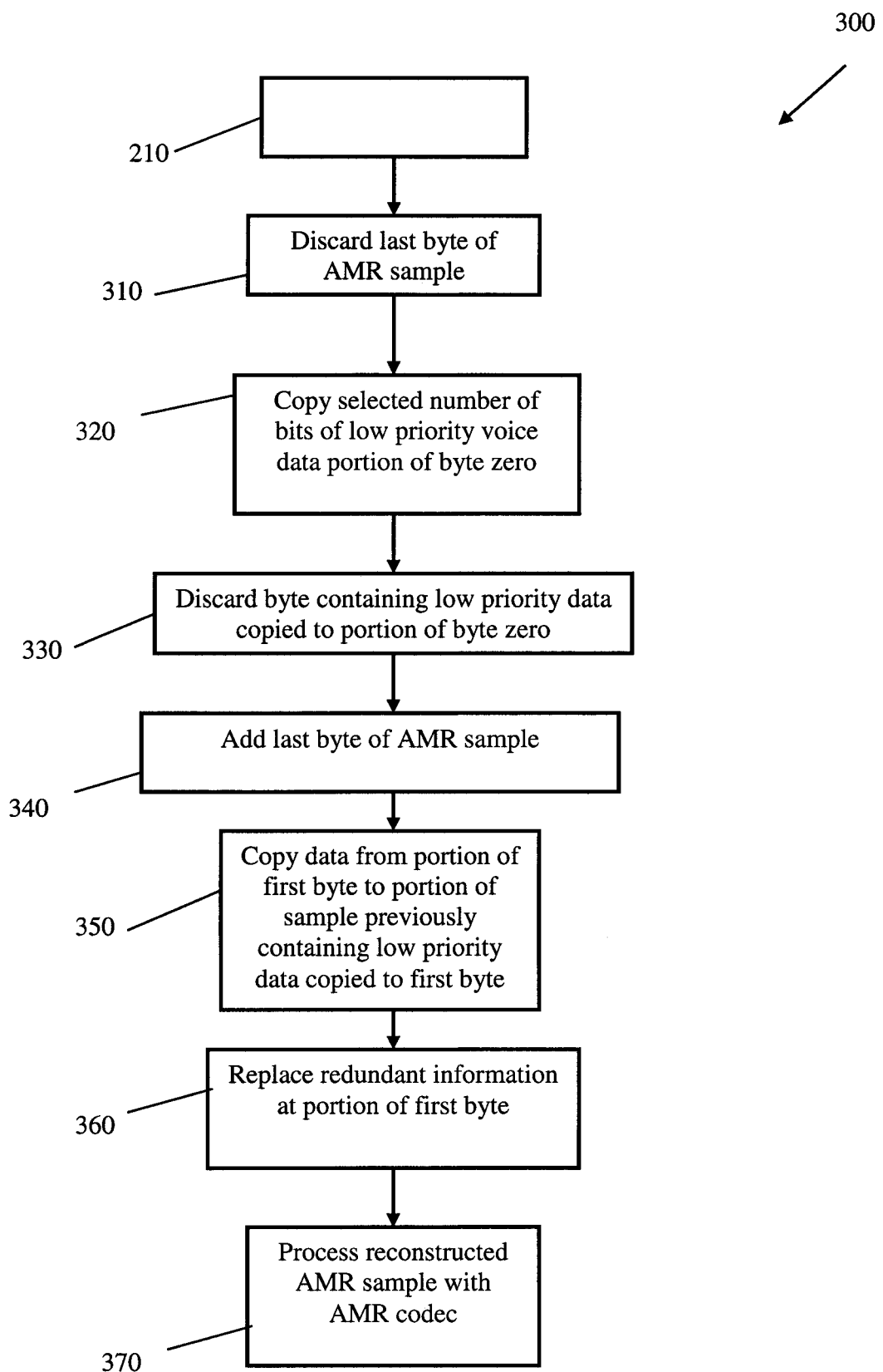
FIG. 3 is a flowchart illustrating a lossy bit stuffing method according to an embodiment of the present invention.

FIG. 3 is a flowchart illustrating a lossy bit stuffing method according to an embodiment of the present invention. Method 300 may be provided for AMR IF2 frame formats for the 5.15 mode codec such as that shown in Table 3. Embodiments of method 300 may advantageously reduce each AMR sample beyond that provided for method 200 by utilizing the knowledge of redundancy of information coupled with the different treatments afforded to classes of bits in the sample. In method 300, the AMR sample may be reduced from its original size of 14 bytes to 12 bytes. Accordingly, in the lossy method, bandwidth efficiency is increased beyond that achieved in the lossless method.

Recognizing the significance of the different classes of AMR bits being communicated, it may be possible to discard various data without significantly degrading voice quality, in view of MOS ratings. In various embodiments of the invention, AMR mode codecs include A, B or A, B and C classes of bits, which may be treated differently.

Method 300 begins with block 210 of FIG. 2. Accordingly, a portion of the redundant information in the first byte is removed. In one embodiment, the portion may correspond to one or more bits of the frame type portion of the first byte. In other embodiments, the portion may correspond to any number of bits in the first byte. The maximum number of bits in the first byte may be removed in some embodiments.

In block 310, the last byte of the AMR sample, which includes only a limited number of voice data bits, may be discarded without copying the voice data bits to another portion of the AMR sample. In block 320, a selected number of bits within the byte that was immediately preceding the last byte of the AMR sample may be copied (or moved) to a same number of the bits of the first byte. Again, the number of bits may be any number of bits less than or equal to the number of bits in byte zero in cases when the entirety of byte zero is redundant, or the number of bits may be any number of bits less than or equal to the number of bits in the frame type portion of byte zero when only the frame type portion is redundant. In block 330, the byte that was immediately preceding the last byte of the AMR sample, and from which bits were copied (or moved) to byte zero, is discarded. Accordingly, both the last byte and the byte that was immediately preceding the last byte are discarded thereby reducing the bandwidth required during transmission of the AMR sample. However, as shown with reference to Table 2 and FIG. 1, the bits placed in and near the last byte of an AMR sample have a lower priority than those bits near bytes one and two. Accordingly, discarding the last two bytes of bits in the AMR sample advantageously reduces the required bandwidth while avoiding significant degradation of the voice quality. For example, in the AMR 5.15 codec mode, the last byte would include a number of Class B bits. Discarding Class B bits may be performed without significant degradation of voice quality.

Before transmission, the AMR sample that is reduced in size may then be encrypted for security provisioning of the voice data. Blocks 210, 310, 320 and 330 may be performed at a transmitter.

The receiver may perform the reconstruction operations. Decryption may be first performed to decrypt any encrypted received information. Next, in block 340, the last byte of the AMR sample may be added. In various embodiments, the last byte may then be filled with null bits, randomly selected bits or filled with bits according to any designated approach as dictated by the system designer. In some embodiments, the last byte may be filled with comfort noise bits from a previous sample.

In block 350, the bits copied (or moved) to the first byte in step 320 may be copied (or moved) into a selected number of the bits of the byte immediately preceding the last byte, which was added in step 340. In one embodiment, the bits are copied (or moved) into the least significant four bits of byte 12. As noted above, within a class of bits, as bits are positioned near the back of the AMR sample, they may receive a lower class of treatment. Accordingly, while any bits in byte 12 may be utilized for stuffing byte zero, selection of a number of the least significant bits in byte 12 may be performed with less degradation than selection of a number of the more significant bits in byte 12.

In block 360, redundant information is placed in byte zero at the locations at which the byte 12 bits were previously placed in byte zero. In some embodiments, the redundant information may be placed in byte zero at any locations notwithstanding the byte 12 bits were previously placed in other locations in byte zero. In one embodiment, redundant information is placed only in the frame type portion of the sample when the bits of byte 12 were copied (or moved) to the frame type portion bits of byte zero. The redundant information may be information indicative of the frame type or indicative of any other redundant information. The redundant information may be identified based on the known frame structure of AMR mode codecs or based on empirical evidence of redundant information. For example, any of the bits of byte zero may be replaced based on empirical evidence of the occurrence of the same bit values in byte zero for AMR 5.15 mode codec samples.

In block 370, the reconstructed AMR sample is then processed by the AMR codec for decoding and subsequent playback. In one embodiment, seven comfort bits may have been lost if three of the voice data bits of the last byte and four of the byte 12 bits are discarded. However, because of the class of bits discarded, discarding may be performed without significant degradation of voice quality such that the quality is less than an "acceptable" MOS rating.

Method 300 may be lossy; however, embodiments of method 300 may advantageously also align each sample on a 32 bit boundary using bit stuffing. Aligning data in this manner in processors may allow computational operations to be performed faster, which is especially important when providing encryption to the data.

In one embodiment of the invention, the first byte (i.e., byte zero) includes redundant or previously-known information that may be removed. Further, the last byte (i.e., byte 13) includes only three voice data bits as the remainder of byte 13 is a mere bit stuffing portion that may include null bits.

Accordingly, degradation of the voice quality is not significantly affected by discarding byte 13 without copying (or moving) the voice data bits of byte 13 to byte zero.

Next, byte 12 of the 5.15 mode sample contains eight bits of Class B data as is well-known to those skilled in the art as provided in the reference cited herein and incorporated by reference in its entirety. Because byte 12 contains low priority Class B information, a number of bits in byte 12 may be copied (or moved) and the remainder of the bits of byte 12 discarded without significantly degrading voice quality.

In some embodiments, the number of bits of byte 12 that are copied (or moved) are any number of bits less than or equal to the number of bits in the packet field type portion of byte zero. Accordingly, the number of bits of byte 12 that are copied (or moved) is four or less bits. The remainder of the number of bits in byte 12 that are not copied (or moved) may be discarded. In various embodiments, the least number of bits from byte 12 that may be copied (or moved) are operated upon as such so as to discard the greatest number of bits while maintaining an acceptable MOS rating.

Referring back to method 300, in one embodiment of the invention, only four bits of byte 12 are copied (or moved) to the frame type portion in byte zero. The four bits are copied (or moved) to the four bits of byte zero. Byte 12 is then discarded. Accordingly, while byte 13 and byte 12 were discarded, only seven bits of information are lost. Further, due to the nature of the information (i.e., byte 12 includes Class B information), there is no significant degradation in voice quality. In some embodiments, any number of bits may be lost as long as the MOS achieves an acceptable rating. As many bits may be lost as possible while still staying within the "acceptable" range within MOS scoring. Accordingly, greater than seven bits may be discarded in some embodiments. For example, in some cases 7 bits out of 54 bits may be discarded. In other cases, 8, 9, 10 or 11 bits out of 54 bits may be discarded while still maintaining a MOS score within the "acceptable" range.

In the preceding description, the byte 12 bits were Class B bits; however, byte 12 bits may be Class C or even Class A bits in other embodiments of the invention. In the embodiment of the invention, the principle of discarding the bits that are to receive the lowest level of treatment may be followed in determining the bytes, and the number of bits within the byes, to discard.

The AMR sample may then be transmitted, or encrypted and then transmitted.

A receiver performs operations to reconstruct the voice data. In one embodiment, the receiver performs any decryption of encrypted information. The receiver then copies (or moves) the number of bits that were copied (or moved) to the frame type field portion of byte zero back to byte 12. In one embodiment, the number of bits copied (or moved to) the frame type field in byte zero back to byte 12 is four bits.

The receiver also places the redundant information back in the frame type field portion of byte zero. In some embodiments, the redundant information is indicative of the frame type in the frame type portion of byte zero. The receiver adds a last byte of bits where, in some embodiments, the last byte of bits includes null values. In some embodiments, the last byte of bits includes comfort noise bits from a previous sample.

The receiver then processes the reconstructed AMR sample with an AMR codec for decoding and playback. As noted above, the information lost and thereby not present in the reconstructed AMR sample are the three data bits that were in byte 13 and the number of bits that were in byte 12 that were not copied (or moved) to byte zero. In one embodiment, the number of bits in byte 12 that are lost is four. In other embodiments, the number of bits discarded in byte 12 may be any number of bits. For example, because it is desirous to copy (or move) the least number of bits in byte 12 to byte zero, as few as zero bits of byte 12 may be moved if discarding all eight bits in byte 12 will still result in an acceptable MOS rating.

In various embodiments of security protocols, each transmission of voice data may require up to an additional 16 bytes of overhead to securely communicate the information necessary to decode an encrypted frame. In some embodiments of the invention, the number of bytes of overhead may be reduced by collecting voice samples together to form a larger voice data payload, thus reducing the overhead to payload ratio. Using the optimization that is discussed with reference to FIG. 3 and collecting 5 samples (100 milliseconds) of voice data together would yield a 60 byte frame to be encrypted. Adding in the 16 bytes of overhead would generate a 76 byte packet 10 times every second or a maximum bit rate of 7.6 kbit/s. Accordingly, with this embodiment, any standard providing a bit rate greater than 7.6 kbits/s may be employed for transmission of the data while provisioning security.

Figure 4:
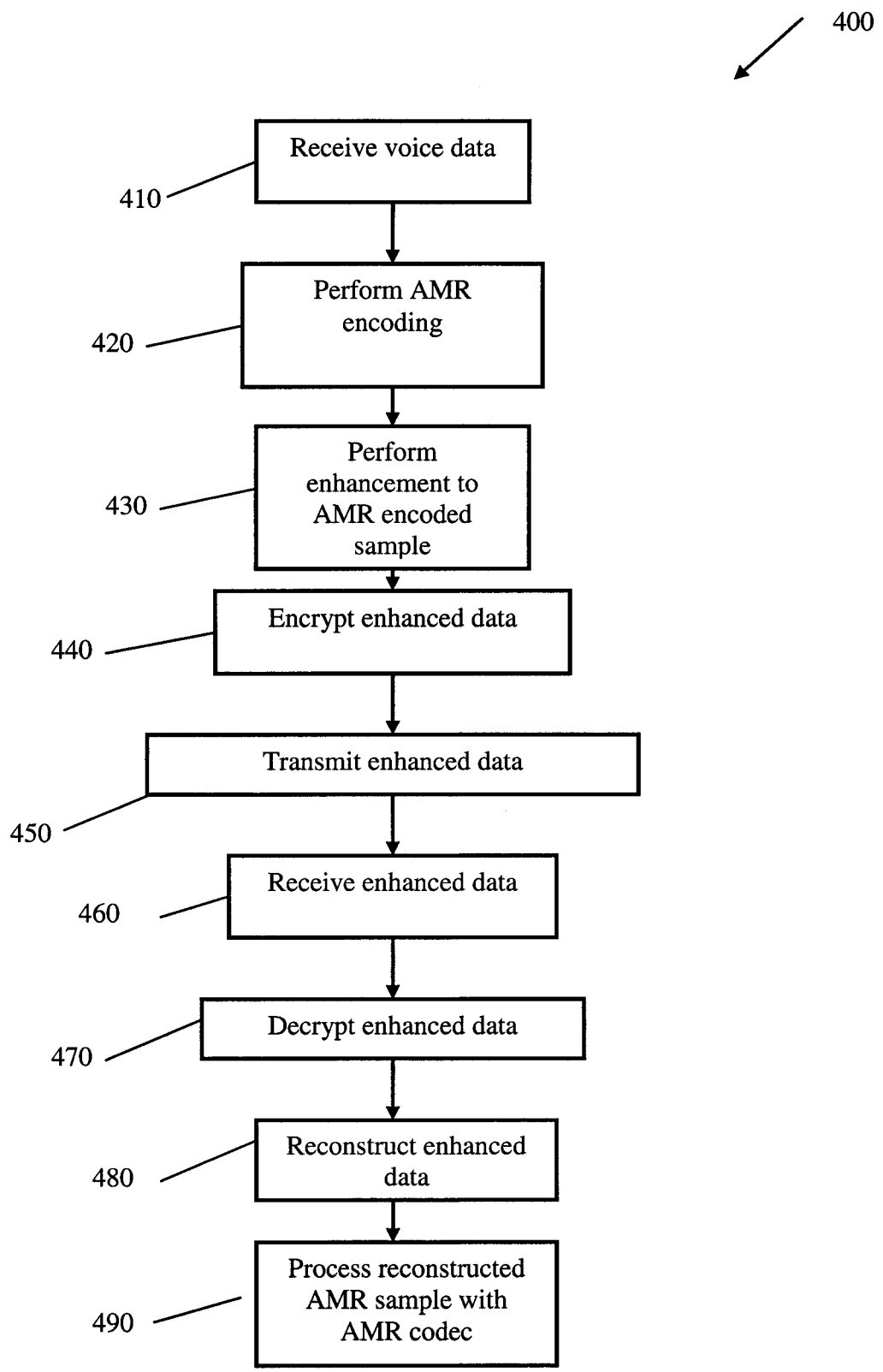
FIG. 4 is a flowchart for voice communications enhancement according to an embodiment of the present invention.

FIG. 4 is a flowchart for voice communications enhancement according to an embodiment of the present invention. In method 400, in block 410, voice data is received. Voice data may be received at an apparatus of any suitable device capable of receiving voice data. In one embodiment, voice data is received at a first mobile handset.

In block 420, AMR encoding is performed. AMR encoding may be performed for the 5.15 codec mode in some embodiments of the invention. In other embodiments of the invention, other modes may be implemented.

In block 430, the encoded AMR sample may be enhanced. In some embodiments, enhancing the encoded AMR sample may be performed by any of method 200 or method 300. In some embodiments, the method may optionally include encrypting the enhanced data, which is performed at block 440.

In block 450, the encoded voice data may be transmitted. In block 460, the encoded voice data may be received. Encoded voice data may be received at a communication device. In various embodiments, the communication device may be a mobile headset or a mobile handset.

In block 470, in some embodiments, the method may optionally include decrypting the enhanced data if it is encrypted. In block 480, the enhanced data may be reconstructed. Reconstruction may include the methods or portions thereof or any other methods for reconstructing samples provided herein. In block 490, the reconstructed data may be processed by an AMR codec such as that which may be found in mobile headsets.

In some embodiments of the invention, a module for adaptive multi-rate protocol enhancement according to an embodiment of the present invention may be provided. In various embodiments, the module (not shown) may be hardware, software or a combination of hardware and software. In some embodiments, the module includes a processor and a computer program product. The computer program product may include a computer-readable medium having computer-readable program code stored on the computer-readable medium and configured to be accessed by the processor to cause the processor to execute one or more of the methods 200, 300, 400 or any other methods described herein. Any processor capable of reading computer-readable program code and executing the instructions thereof may be used.

While the foregoing description of embodiments of the invention describe the invention for AMR codecs, the same principles described herein may be applied to any number of different types of codecs. The principles include identifying a location of redundant information in a sample, identifying a location of data bits in a selected byte at any location in the sample and removing at least some of the redundant information. The principles also include copying or moving the data bits to the area in which the redundant bits were previously located. Accordingly, embodiments of the invention cover a number of different codecs, which includes AMR codecs of different modes as well as non-AMR codecs. Embodiments of the invention cover all such embodiments, which are all envisaged herein.

Additionally, the foregoing description of embodiments of the invention has been presented for purposes of illustration. It is not intended to be exhaustive or to limit the invention to the precise form disclosed, and modifications and variations are possible in light of the above teaching or may be acquired from practice of the invention. The embodiments were chosen and described in order to explain the principles of embodiments of the invention and its practical application.

Further, the operations of one or more methods steps may be performed in a single step or performed in numerous additional steps beyond that shown and discussed. Additionally, it should be noted that although the flowcharts provided herein show specific orders of method steps, it is understood that the orders of steps may differ from what is depicted. Also the steps could be performed concurrently or with partial concurrence. All such variations are within the scope of the invention.

Finally, values described in the embodiments of the invention are merely exemplary and, as known by those of ordinary skill in the art, may be modified as desired while still remaining within the spirit and scope of embodiments of the invention.

We claim:

1. A method of processing a codec sample, the method comprising:

removing, using a computing apparatus, from a first portion of the codec sample, a first number of first information bits, the first information bits being indicative of frame information associated with the codec sample, wherein the codec sample comprises a first set of high-priority bits designated to receive a first level of treatment and a first set of reduced-priority bits designated to receive a second level of treatment, the first level of treatment including greater error protection provisioning than the second level of treatment, and wherein the data bits inserted at the first portion of the codec sample are high-priority bits, wherein the first information bits indicate the Adaptive Multi-Rate (AMR) mode by which the codec sample will be processed;

inserting, using a computing apparatus, at the first portion of the codec sample from a second portion of the codec sample, a second number of data bits that are copied from the second portion of the codec sample, the first number of the first information bits being greater than or equal to the second number of the data bits; and removing, using a computing apparatus, the second portion of the codec sample to decrease an amount of bytes associated with the codec sample by at least one byte.

2. The method of claim 1, wherein the codec sample is an adaptive multi-rate codec sample.

3. The method of claim 2, wherein the adaptive multi-rate codec sample is a 5.15 mode adaptive multi-rate codec sample.

4. The method of claim 1, further comprising encrypting the codec sample.

5. The method of claim 4, further comprising decrypting the encrypted codec sample.

6. The method of claim 1, wherein processing the codec sample is performed during a first time interval and the frame information associated with the codec sample is redundant relative to frame information associated with another codec sample processed during a second time interval occurring before the first time interval.

7. The method of claim 1, wherein the data bits are indicative of voice information.

8. The method of claim 1, wherein the first portion of the codec sample is the first byte of the codec sample.

9. The method of claim 1, further comprising:
inserting at the codec sample at a location from which the second portion of the codec sample was removed, the second number of the data bits located at the first portion of the codec sample; and
inserting at the first portion of the codec sample, a first number of previously-known information bits, the previously-known information bits being substantially identical in content to the first information bits.

10. The method of claim 1, further comprising removing a third portion of the codec sample, the third portion of the codec sample comprising a first number of final data bits.

11. The method of claim 10, further comprising:
inserting in the codec sample at a location from which the second portion of the codec sample was removed, the second number of the data bits located at the first portion of the codec sample;
inserting at the first portion of the codec sample, a first number of previously-known information bits, the previously-known information bits being substantially identical in content to the first information bits; and
inserting in the codec sample at a location from which the third portion of the codec sample was removed, a first number of reconstruction bits.

12. The method of claim 11, wherein the reconstruction bits are comfort noise bits.

13. The method of claim 11, wherein the reconstruction bits are substantially identical in content to the final data bits.

14. The method of claim 11, wherein the data bits are designated to receive a first level of treatment and the final data bits are designated to receive a second level of treatment, wherein the first level of treatment includes greater error protection provisioning than the second level of treatment.

15. A system for processing a codec sample, the system comprising:
a computing apparatus configured to identify previously-known information in the codec sample, wherein the codec sample comprises a first set of high-priority bits designated to receive a first level of treatment and a first set of reduced-priority bits designated to receive a second level of treatment, the first level of treatment including greater error protection provisioning than the second level of treatment, and wherein the data bits inserted at the first portion of the codec sample are high-priority bits;
a computing apparatus configured to identify data bits to preserve during processing and transmission of the codec sample;
a computing apparatus configured to insert the identified data bits at a location corresponding to a location of the previously-known information by copying the identified data bits to the location corresponding to the location of the previously-known information, wherein the previously-known information comprises a frame type of the codec sample that indicates the Adaptive Multi-Rate (AMR) mode by which the codec sample will be processed; and
a computing apparatus configured to discard a location corresponding to a location of the data bits to decrease an amount of bytes associated with the codec sample by at least one byte and thereby generating an enhanced codec sample.

16. The system of claim 15, wherein the previously-known information is indicative of frame type information associated with the codec sample.

17. The system of claim 15, wherein the system is configured to be coupled to a mobile handset or a mobile headset.

18. A system for processing a codec sample, the system comprising:
a communication channel;
a first mobile apparatus configured to be communicatively coupleable to the communication channel, the first mobile apparatus comprising:
a first module configured to perform the steps of:
removing from a first portion of the codec sample, a first number of first information bits, the first information bits being indicative of frame information associated with the codec sample, wherein the codec sample comprises a first set of high-priority bits designated to receive a first level of treatment and a first set of reduced-priority bits designated to receive a second level of treatment, the first level of treatment including greater error protection provisioning than the second level of treatment, and wherein the data bits inserted at the first portion of the codec sample are high-priority bits, wherein the first information bits indicate the Adaptive Multi-Rate (AMR) mode by which the codec sample will be processed;
inserting at the first portion of the codec sample from a second portion of the codec sample, a second number of data bits that are copied from the second portion of the codec sample, the first number of the first information bits being greater than or equal to the second number of the data bits; and removing the second portion of the codec sample to decrease an amount of bytes associated with the codec sample by at least one byte;

an encryption mechanism configured to encrypt the codec sample thereby generating an encrypted codec sample; and a transmitter configured to transmit the encrypted codec sample over the communication channel; and a second mobile apparatus configured to be communicatively coupleable to the communication channel, the second mobile apparatus comprising:

a receiver configured to receive the encrypted codec sample;

a decryption mechanism configured to decrypt the encrypted codec sample thereby generating the codec sample;

a second module configured to perform the steps of:
   inserting at the codec sample at a location from which the second portion of the codec sample was removed, the second number of the data bits located at the first portion of the codec sample; and
   inserting at the first portion of the codec sample, a first number of previously-known information bits, the previously-known information bits being substantially identical in content to the first information bits.

19. The system of claim 18, wherein at least one of the first mobile apparatus and the second mobile apparatus is a mobile headset or a mobile handset.

* * * * *

UNITED STATES PATENT AND TRADEMARK OFFICE
CERTIFICATE OF CORRECTION

| | | |
|---|---|---|
| PATENT NO. | : 8,548,002 B2 | Page 1 of 1 |
| APPLICATION NO. | : 12/028370 | |
| DATED | : October 1, 2013 | |
| INVENTOR(S) | : Fascenda et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 574 days.

Signed and Sealed this
Tenth Day of March, 2015

Michelle K. Lee
*Deputy Director of the United States Patent and Trademark Office*